(12) United States Patent
Elmikaty et al.

(10) Patent No.: US 11,182,910 B2
(45) Date of Patent: Nov. 23, 2021

(54) METHOD AND APPARATUS FOR IMAGE PROCESSING

(71) Applicant: OXEHEALTH LIMITED, Oxford (GB)

(72) Inventors: Mohamed Elmikaty, Oxford (GB); Simon Mark Chave Jones, Oxford (GB)

(73) Assignee: OXEHEALTH LIMITED, London (GB)

( * ) Notice: Subject to any disclaimer, the term of this patent is extended or adjusted under 35 U.S.C. 154(b) by 0 days.

(21) Appl. No.: 16/334,211

(22) PCT Filed: Sep. 19, 2017

(86) PCT No.: PCT/GB2017/052779
§ 371 (c)(1),
(2) Date: Mar. 18, 2019

(87) PCT Pub. No.: WO2018/051142
PCT Pub. Date: Mar. 22, 2018

(65) Prior Publication Data
US 2019/0279376 A1    Sep. 12, 2019

(30) Foreign Application Priority Data

Sep. 19, 2016   (GB) ...................... 1615899

(51) Int. Cl.
*G06K 9/00* (2006.01)
*G06T 7/262* (2017.01)
(Continued)

(52) U.S. Cl.
CPC .......... *G06T 7/262* (2017.01); *G06K 9/00744* (2013.01); *G06K 9/4661* (2013.01);
(Continued)

(58) Field of Classification Search
CPC ....... G06T 7/262; G06T 7/97; G06K 9/00744; G06K 9/4661; G08B 21/0476
(Continued)

(56) References Cited

U.S. PATENT DOCUMENTS 8,855,384 B2   10/2014   Kyal et al.
8,965,090 B1   2/2015    Khachaturian et al.
(Continued)

FOREIGN PATENT DOCUMENTS

EP   0615245 A2   9/1994
EP   0919184 A1   6/1999
(Continued)

OTHER PUBLICATIONS

International Preliminary Report on Patentability and Written Opinion regarding Applicaiton No. PCT/GB2017/052779 dated Mar. 19, 2019.
(Continued)

*Primary Examiner* — Stephen P Coleman
(74) *Attorney, Agent, or Firm* — Harness, Dickey & Pierce, P.L.C.

(57) ABSTRACT

In order to detect gross subject movement in a video image in a way which is not sensitive to illumination change, for example illumination changes caused by movement of shadows or sunlight, spaced pairs of image frames are selected from a video sequence and sub-divided into cells, and spatial frequency analysis is performed in each cell. The magnitude of the spatial frequency components in corresponding cells in the two selected image frames are compared. If the number of cells with high magnitude difference is high then the video image is determined as containing gross subject movement whereas if the number of cells with high magnitude differences is low, the sequence is determined as not (Continued)

Figure 1:
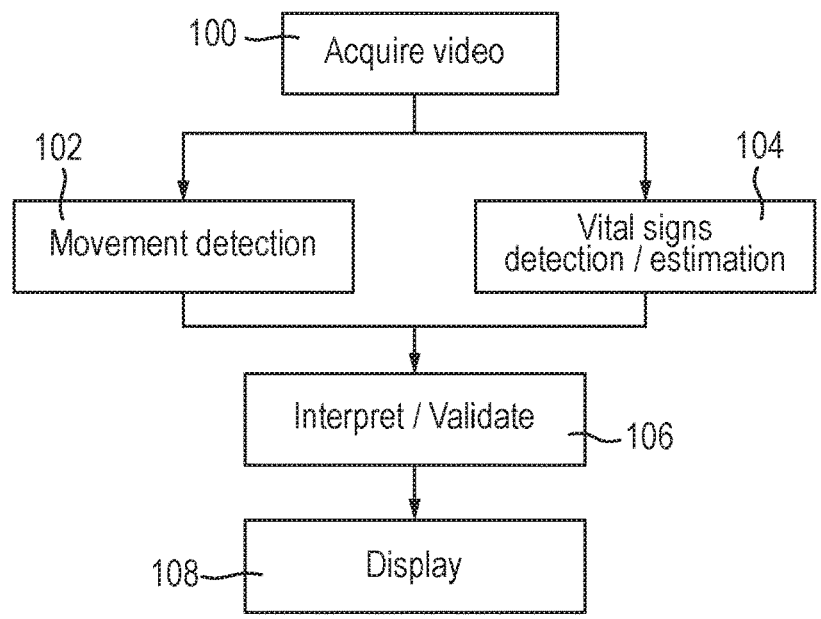

containing gross movement, though it may contain illumination changes or no or fine movement.

10 Claims, 3 Drawing Sheets

(51) Int. Cl.
　　　G06T 7/00　　　　(2017.01)
　　　G06K 9/46　　　　(2006.01)
　　　G08B 21/04　　　 (2006.01)
(52) U.S. Cl.
　　　CPC ............ *G06T 7/97* (2017.01); *G08B 21/0476* (2013.01); *G06K 2009/00738* (2013.01); *G06T 2207/10016* (2013.01)
(58) Field of Classification Search
　　　USPC ....................................................... 382/103
　　　See application file for complete search history.

(56) References Cited

U.S. PATENT DOCUMENTS

| | | | |
|---|---|---|---|
| 9,036,877 B2 | 5/2015 | Kyal et al. | |
| 10,034,979 B2 | 7/2018 | Bechtel et al. | |
| 10,292,662 B2 | 5/2019 | Kirenko | |
| 2002/0106709 A1 | 8/2002 | Potts et al. | |
| 2002/0180870 A1 | 12/2002 | Chen | |
| 2003/0138149 A1* | 7/2003 | Iizuka .................. | H04N 9/8227 382/236 |
| 2003/0228032 A1 | 12/2003 | Rui et al. | |
| 2005/0078747 A1* | 4/2005 | Hamza .................... | G06T 7/277 375/240.01 |
| 2005/0197590 A1 | 9/2005 | Osorio et al. | |
| 2006/0058618 A1 | 3/2006 | Nishiura | |
| 2007/0156060 A1 | 7/2007 | Cervantes | |
| 2007/0195931 A1 | 8/2007 | Ohishi | |
| 2008/0152256 A1* | 6/2008 | Ou ............................ | G06T 5/50 382/276 |
| 2008/0181457 A1* | 7/2008 | Chattopadhyay .. | G06K 9/00771 382/103 |
| 2008/0292151 A1 | 11/2008 | Kurtz et al. | |
| 2009/0216499 A1 | 8/2009 | Tobola et al. | |
| 2009/0279741 A1* | 11/2009 | Susca ...................... | G06T 7/246 382/107 |
| 2010/0003005 A1* | 1/2010 | Sugihara ................. | G11B 27/28 386/248 |
| 2010/0049064 A1 | 2/2010 | Bodmer et al. | |
| 2010/0074475 A1 | 3/2010 | Chouno | |
| 2010/0298656 A1 | 11/2010 | McCombie et al. | |
| 2011/0046498 A1 | 2/2011 | Klap et al. | |
| 2011/0150274 A1 | 6/2011 | Patwardhan et al. | |
| 2011/0224498 A1* | 9/2011 | Banet .................... | A61B 5/6824 600/300 |
| 2011/0251493 A1 | 10/2011 | Poh et al. | |
| 2011/0311143 A1 | 12/2011 | Cennini et al. | |
| 2012/0141000 A1 | 6/2012 | Jeanne et al. | |
| 2012/0146789 A1* | 6/2012 | De Luca .................. | H04N 3/38 340/540 |
| 2012/0213405 A1 | 8/2012 | Sasaki | |
| 2012/0242819 A1 | 9/2012 | Schamp | |
| 2013/0138009 A1 | 5/2013 | Nierenberg et al. | |
| 2013/0324875 A1 | 12/2013 | Mestha et al. | |
| 2014/0003690 A1 | 1/2014 | Razeto et al. | |
| 2014/0023235 A1 | 1/2014 | Cennini et al. | |
| 2014/0037163 A1 | 2/2014 | Kirenko et al. | |
| 2014/0037166 A1 | 2/2014 | De Haan et al. | |
| 2014/0236036 A1 | 8/2014 | de Haan et al. | |
| 2014/0276099 A1 | 9/2014 | Kirenko et al. | |
| 2014/0276104 A1 | 9/2014 | Tao et al. | |
| 2014/0334697 A1 | 11/2014 | Kersten et al. | |
| 2014/0371599 A1 | 12/2014 | Wu et al. | |
| 2014/0371635 A1 | 12/2014 | Shinar et al. | |
| 2014/0378842 A1 | 12/2014 | Xu et al. | |
| 2015/0005646 A1 | 1/2015 | Balakrishnan et al. | |
| 2015/0063708 A1 | 3/2015 | Sripadarao et al. | |
| 2015/0148687 A1 | 5/2015 | Kitajima et al. | |
| 2015/0208987 A1 | 7/2015 | Shan et al. | |
| 2015/0221069 A1 | 8/2015 | Shaburova et al. | |
| 2015/0250391 A1 | 9/2015 | Kyal et al. | |
| 2015/0363361 A1 | 12/2015 | Kniazev | |
| 2016/0106340 A1 | 4/2016 | Mestha et al. | |
| 2016/0125260 A1 | 5/2016 | Huang et al. | |
| 2016/0132732 A1 | 5/2016 | Gunther et al. | |
| 2016/0220128 A1 | 8/2016 | Den Brinker et al. | |
| 2016/0253820 A1 | 9/2016 | Jeanne et al. | |
| 2016/0310067 A1 | 10/2016 | Heinrich et al. | |
| 2017/0007185 A1 | 1/2017 | Lin et al. | |
| 2017/0042432 A1 | 2/2017 | Adib et al. | |
| 2017/0224256 A1 | 8/2017 | Kirenko | |
| 2017/0238805 A1 | 8/2017 | Addison et al. | |
| 2017/0238842 A1 | 8/2017 | Jacquel et al. | |
| 2018/0068431 A1* | 3/2018 | Takeda ...................... | G06T 7/11 |
| 2018/0085010 A1 | 3/2018 | Jones et al. | |
| 2018/0136470 A1* | 5/2018 | Levinshtein .............. | G06T 7/73 |
| 2018/0279885 A1 | 10/2018 | Bulut | |
| 2019/0000391 A1 | 1/2019 | De Haan et al. | |
| 2019/0267040 A1 | 8/2019 | Ikeda et al. | |

FOREIGN PATENT DOCUMENTS

| | | |
|---|---|---|
| EP | 1571594 A2 | 9/2005 |
| EP | 2767233 A1 | 8/2014 |
| EP | 2976998 A1 | 1/2016 |
| EP | 2988274 A2 | 2/2016 |
| EP | 3073905 A1 | 10/2016 |
| EP | 3207862 A1 | 8/2017 |
| JP | 2011130996 A | 7/2011 |
| WO | WO-2010/100593 A1 | 9/2010 |
| WO | WO-2010/115939 A2 | 10/2010 |
| WO | WO-2011021128 A2 | 2/2011 |
| WO | WO-2013027027 A2 | 2/2013 |
| WO | WO-2014125250 A1 | 8/2014 |
| WO | WO-2014131850 A1 | 9/2014 |
| WO | WO-2014140994 A1 | 9/2014 |
| WO | WO-201504915 A1 | 4/2015 |
| WO | WO-2015049150 A1 | 4/2015 |
| WO | WO-2015055709 A1 | 4/2015 |
| WO | WO-2015/078735 A1 | 6/2015 |
| WO | WO-2015/091582 A1 | 6/2015 |
| WO | WO-2015172735 A1 | 11/2015 |
| WO | WO-2016092290 A1 | 6/2016 |
| WO | WO-2016094749 A1 | 6/2016 |
| WO | WO-2016159151 A1 | 10/2016 |
| WO | WO-2017125743 A1 | 7/2017 |
| WO | WO-2017125744 A1 | 7/2017 |
| WO | WO-2017125763 A1 | 7/2017 |

OTHER PUBLICATIONS

Pisani, Francesco et al. "Real-time automated detection of clonic seizures in newborns." Clinical Neurophysiology, (2014) http://dx.doi.org/10.1016/j.clinph.2013.12.119.
International Search Report and Written Opinion for PCT/GB2017/052779, dated Nov. 10, 2017; ISA/EP.
Search Report for GB Application No. 1615899.0, dated Feb. 28, 2017.
U.S. Appl. No. 16/732,769, filed Jan. 2, 2020, Nicholas Dunkley Hutchinson.
U.S. Appl. No. 16/732,979, filed Jan. 2, 2020, Nicholas Dunkley Hutchinson.
U.S. Appl. No. 16/733,065, filed Jan. 2, 2020, Nicholas Dunkley Hutchinson.
U.S. Appl. No. 15/961,279, filed Apr. 24, 2018, Nicholas Dunkley Hutchinson.
U.S. Appl. No. 16/071,542, filed Jul. 20, 2018, Nicholas Dunkley Hutchinson.
U.S. Appl. No. 16/071,570, filed Jul. 20, 2018, Simon Mark Chave Jones.
U.S. Appl. No. 16/071,591, filed Jul. 20, 2018, Muhammad Fraz.

(56) References Cited

OTHER PUBLICATIONS

U.S. Appl. No. 16/071,611, filed Jul. 20, 2018, Nicholas Dunkley Hutchinson.
U.S. Appl. No. 16/291,728, filed Mar. 4, 2019, Nicholas Dunkley Hutchinson.
U.S. Appl. No. 16/347,925, filed May 7, 2019, Simon Mark Chave Jones.
Nathalie M. El Nabbout et al, "Automatically Detecting and Tracking People Walking through a Transparent Door with Vision", Computerand Robot Vision, 2008. CRV '08. Canadian Conference on, IEEE, Piscataway, NJ, USA, May 2 8, 2008 (May 28, 2008), pp. 171-178.
Qiang Zhu et al, "Learning a Sparse, Corner-Based Representation for Corner-Based Representation for Time-varying Background Modeling", Computer Vision, 2005. ICCV 2005. Tenth IEEE International Conference on Beijing, China Oct. 17-20, 2005, Piscataway, NJ, USA, IEEE, Los Alamitos, CA, USA, vol. 1, Oct. 17, 2005 (Oct. 17, 2005), pp. 678-685.
Konstantinos Avgerinakis et al, "Activity detection and recognition of daily living events", Proceedings of the 1st ACM International Workshop on Multimedia Indexing and Information Retrieval for Healthcare, MIIRH '13, Oct. 22, 2013 (Oct. 22, 2013), pp. 1-7.
Arindam Sikdar et al, "Computer-Vision-Guided Human Pulse Rate Estimation: A Review", IEEE Reviews in Biomedical Engineering, vol. 9, Sep. 16, 2016 (Sep. 16, 2016), pp. 91-105.
Yu Sun et al,"Photoplethysmography Revisited: From Contact to Noncontact, From Point to Imaging", IEEE Transactions on Biomedical Engineering, IEEE Service Center, Piscataway, NJ, USA, vol. 63, No. 3, Mar. 1, 2016 (Mar. 1, 2016), pp. 463-477.
Tongchi Zhou et al, "A study of relative motion point trajectories for action recognition", 2015 International Conference on Wireless Communications & Signal Processing (WCSP), IEEE, Oct. 15, 2015 (Oct. 15, 2015), pp. 1-5.
Hisato Aota et al, "Extracting objects by clustering of full pixel trajectories", Signal Processing and Multimedia Applications (SIGMAP), Proceedings of the 2010 International Conference on, IEEE, Jul. 26, 2010 (Jul. 26, 2010), pp. 65-72.
Shandong Wu et al, "A hierarchical motion trajectory signature descriptor", 2008 IEEE International Conference on Robotics and Automation. The Half-Day Workshop on: Towards Autonomous Agriculture of Tomorrow, IEEE—Piscataway, NJ, USA, Piscataway, NJ, USA, May 19, 2008 (May 19, 2008), pp. 3070-3075.
Search Report for GB Application No. 1618828.6, dated Mar. 31, 2017.
International Search Report and Written Opinion for PCT/GB2017/053343, dated Jan. 4, 2018; ISA/EP.
International Search Report for PCT/GB2017/050162, ISA/EP, Rijswijk, NL, dated Jul. 6, 2017.
Written Opinion of the ISA for PCT/GB2017/050162, ISA/EP, Rijswijk, NL, dated Jul. 6, 2017.
Search Report for Priority Application GB1601140.5, UK IPO, Newport, South Wales, dated Jul. 21, 2016.
International Search Report for PCT/GB2017/050127, ISA/EP, Rijswijk, NL, dated Mar. 28, 2017.
Written Opinion of the ISA for PCT/GB2017/050127, ISA/EP, Rijswijk, NL, dated Mar. 28, 2017.
UK IPO Search Report under Section 17(5) for priority application GB1061143.9, dated Mar. 30, 2016.
International Search Report for PCT/GB2017/050128, ISA/EP, Rijswijk, NL, dated Apr. 13, 2017.
Written Opinion of the ISA for PCT/GB2017/050128, ISA/EP, Rijswijk, NL, dated Apr. 13, 2017.
Search Report under Section 17(5) for priority application GB1601142.1, UKIPO, Newport, South Wales, dated Jun. 28, 2016.
Tarassenko et al, "Non-contact video-based vital sign monitoring using ambient light and auto-regressive models", 2014 Physiol. Meas. 35 807, pp. 807-831.
Wu et al, Eulerian Video Magnification for Revealing Subtle Changes in the World, 2012.
International Search Report for PCT/GB2017/050126, ISA/EP, Rijswijk, NL, dated Apr. 20, 2017.
Written Opinion of the ISA for PCT/GB2017/050126, ISA/EP, Rijswijk, NL, dated Apr. 20, 2017.
UK IPO Search Report for GB priority application 1601217.1, Newport, South Wales, dated Jul. 25, 2016.
Search Report regarding United Kingdom Patent Application No. GB1706449.4, dated Oct. 25, 2017.
Amelard Robert et al. "Illumination-compensated non-contact imaging photoplethysmography via dual-mode temporally coded illumination". Progress in Biomedical Optics and Imaging, SPIE—International Society for Optical Engineering, Bellingham, WA, US., vol. 9316, Mar. 5, 2015.
Blocker Timon et al, "An online PPGI approach for camera based heart rate monitoring using beat-to-beat detection", 2017 IEEE Sensors Applications Symposium (SAS), IEEE, Mar. 13, 2017.
Extended European Search Report regarding applicaiton No. 18168310.3-1115 dated Oct. 1, 2018.
European Search Report regarding Application No. EP 19 15 8085 dated Jul. 10, 2019.
Nakajima, Kazuki, Yoshiaki Matsumoto, and Toshiyo Tamura. "Development of real-time image sequence analysis for evaluating posture change and respiratory rate of a subject in bed." Physiological Measurement 22.3 (2001).
Search Report of UKIPO regarding Application No. GB1900033.0 dated Jun. 13, 2019.
British Search Report regarding Appliction No. 1900034.8 dated Jun. 13, 2019.
Extended EP Search Report regarding Application No. 19220090.5 dated Feb. 24, 2020.
Kumar-DistancePPG: Robust non-contact vital signs monitoring using a camera, Optical Society of America (2015).
Verkruysse-Remote Plethysmographic Imaging using Ambient Light, Optics Express (Dec. 22, 2008) vol. 16, No. 26.

\* cited by examiner

METHOD AND APPARATUS FOR IMAGE PROCESSING

CROSS REFERENCE TO RELATED APPLICATIONS

This application is a U.S. National Phase Application under 35 U.S.C. 371 of International Application No. PCT/GB2017/052779 filed on Sep. 19, 2017. This application claims priority to British Application No. 1615899.0 filed on Sep. 19, 2016. The entire disclosures of all of the above applications are incorporated herein by reference.

The present invention relates to a method and apparatus for image processing, and in particular for processing video images.

The automatic analysis and processing of video images, in particular to extract useful information, is of interest in a wide variety of fields. For example, in the field of monitoring the health or welfare of subjects (human or animal for example) proposals have been made for analysing the video images to detect the vital signs (such as heart rate, breathing rate, blood oxygen saturation) of the subject. Such analysis may be based on the PPGi signal in the image as in WO-A2-2013/027027 or on detecting fine movement associated with breathing or heart beat or a combination of the two. In the health and security monitoring fields proposals have also been made for detecting and classifying the gross movement of subjects in a video image as dangerous or non-dangerous, for example the proposal for detecting clonic seizures as described in the paper "Real-time automated detection of clonic seizures in newborns" by Pisani et al.

However a problem common to such fields is distinguishing between the signals of interest and artefacts caused by other effects. For example, illumination changes, whether the scene is illuminated by artificial light or by daylight, can often confound automated image analysis. For example, in the event of trying to detect gross movement of a subject or part of a subject in a video image where the scene is under daylight illumination, an effect such as a cloud passing in front of the sun or trees, bushes or vehicles passing between a window illuminating the scene and the sky or sun, may cause fast movements to appear in the image as shadows, or changes in illumination, passing across the scene. One part of a scene may be in strong sunlight and one in shade creating an apparent edge, which may move. Distinguishing such changes from subject movement is a difficult problem. In the security field the inability to distinguish these effects may result in many false alarms, and thus an alarm eventually being ignored, or in a threshold for triggering an alarm being set high, and then failing to detect intruders. In the health or welfare monitoring field, similar problems of excessive false alarms with low trigger thresholds or lack of alarm with high trigger thresholds also arise.

One aspect of the problem which makes it tough to solve is that one part of the scene may remain under steady illumination (sunlit or shaded) while another part of a scene has large illumination changes. A scene may also be illuminated by a combination of daylight and artificial light, either of which may be at times stable and at times change rapidly. So a global solution (i.e. across the whole image frame) may not work properly.

According to the present invention there is provided a method of analysing a video image comprising a sequence of image frames to detect gross movement of a subject in the image, the method comprising the steps of:

selecting from the video image two image frames spaced by a predetermined number of image frames;
dividing each of the selected image frames into a plurality of cells;
calculating the magnitude of the spatial frequency components in each of the cells in each of the selected image frames;
determining differences between the magnitudes of corresponding spatial frequency components in corresponding cells of the selected frames;
determining the number of cells and spatial frequency components for which the magnitude differences are greater than a first threshold; and
determining that the video sequence contains an illumination change rather than movement of a subject if the number is lower than a second threshold.

This method is effective at distinguishing between gross subject movement and fine or no movement in a way which is unaffected by a changes in illumination caused, for example, by movement of sunlit areas, because image texture, such as is commonly associated with subjects of interest, show up well in a spatial frequency analysis of the image (i.e. have a lot of spatial frequency content), so if the subject (associated with image texture) has gross movement, this will be seen in a high number of large magnitude changes in the spatial frequency components between the two frames under consideration. On the other hand sunlight changes tend to have lower amounts of spatial frequency information in them, thus producing a lower number of large magnitude differences in spatial frequency components between the two frames. This overcomes the problem of simpler video analytics methods that illumination changes can look like gross subject movement.

Thus the method is particularly good at distinguishing between gross movement of the subject and illumination artefacts. By "gross movement" is meant large movement of the subject, the subject as a whole moving (e.g. walking, running, jumping) or movements of whole body parts of the subject (e.g. movement of arms or legs), contrasted with "fine movement", which is the type of small distance movement associated with breathing, heart beat, natural trembling or unconscious movement of the body.

The first and second thresholds may be set by observing video sequences of a subject and scene being imaged and setting thresholds to distinguish gross movement from fine movement and illumination changes. The characterisation of gross movement in the video image sequence is conducted with reference to a threshold which is preferably set in a calibration process. The aim is to distinguish large movements, such as a subject deliberately walking around, moving their arms, or changing position when lying or seated, from the smaller, e.g. unconscious, movements related to, for example, breathing or the cardiac cycle, such as chest rise and fall, small head movement, etc. The distance that such a gross movement or fine movement corresponds to in the individual image frames of the video image sequence depends on the field of view of the video camera and the hardware used (optics and sensor). In the image it will be characterized by different number of pixels affected and the magnitude of the change per pixel. However, a threshold which distinguishes the two types of movement can be established for any given equipment in a calibration process by capturing a video image sequence of a volunteer who is asked, on the one hand, to perform gross movement, such as walking around, moving arms, or changing position when seated or lying, and on the other hand to remain as still as possible, while breathing normally. By observing the spatial frequency changes between the selected frames of the video image sequence in these two different states, the thresholds can be set which distinguishes between them and characterises the gross movement and the fine movement. Thus the first and second thresholds are set in a parameter tuning process comprising the steps of: capturing a video image sequence of a subject who is performing gross movement; capturing a video image sequence containing an illumination change; and setting the first threshold to maximise the difference in the number of cells and spatial frequency components for which the magnitude differences are greater than the first threshold between the two video image sequences. The second threshold is also set by observing the number of cells and spatial frequency components for which the magnitude differences are greater than the first threshold between the two video image sequences.

The magnitude of the spatial frequency components (also known as the 2D power spectrum) in each of the cells in each of the selected image frames may be calculated by a two-dimensional fast Fourier transform in each cell or by another known spectral analysis technique. The spatial frequency magnitudes may be respectively normalised by the largest value of the magnitude of each spatial frequency component before taking the differences which improves invariance to illumination changes.

The mean or sum of the number of cells and spatial frequency components for which the magnitude differences are greater than the first threshold is preferably compared to the second threshold to perform said determination that the video sequence contains an illumination change rather than movement.

The image frames may be subdivided into a rectangular, e.g. square, grid of the cells and the method may be repeated on the video image with a different number or size of cells. Larger cells are more robust to noise and complex changes in illumination whereas smaller cells are more sensitive to smaller movements.

The invention also provides an apparatus for analysing video image in accordance with the method above, the apparatus comprising a video image processor programmed to execute the method on an input video image. The apparatus may be part of a video monitoring system including a video camera to capture video images and a display to display the captured video together with the results of the image analysis. This may form part of a health or welfare monitoring system or a security monitoring system.

The video camera is preferably a standard digital video camera so that the video image sequence is a conventional frame sequence with each frame comprising an array of pixel intensities. The camera may be monochrome or may be a colour camera providing pixel intensities in the red, green and blue channels.

The invention may be embodied in a computer program for processing a captured video image sequence in accordance with the invention and for outputting the resulting determination.

The invention will be further described by way of non limited example with reference to the accompanying drawing in which:—

Figure 2:
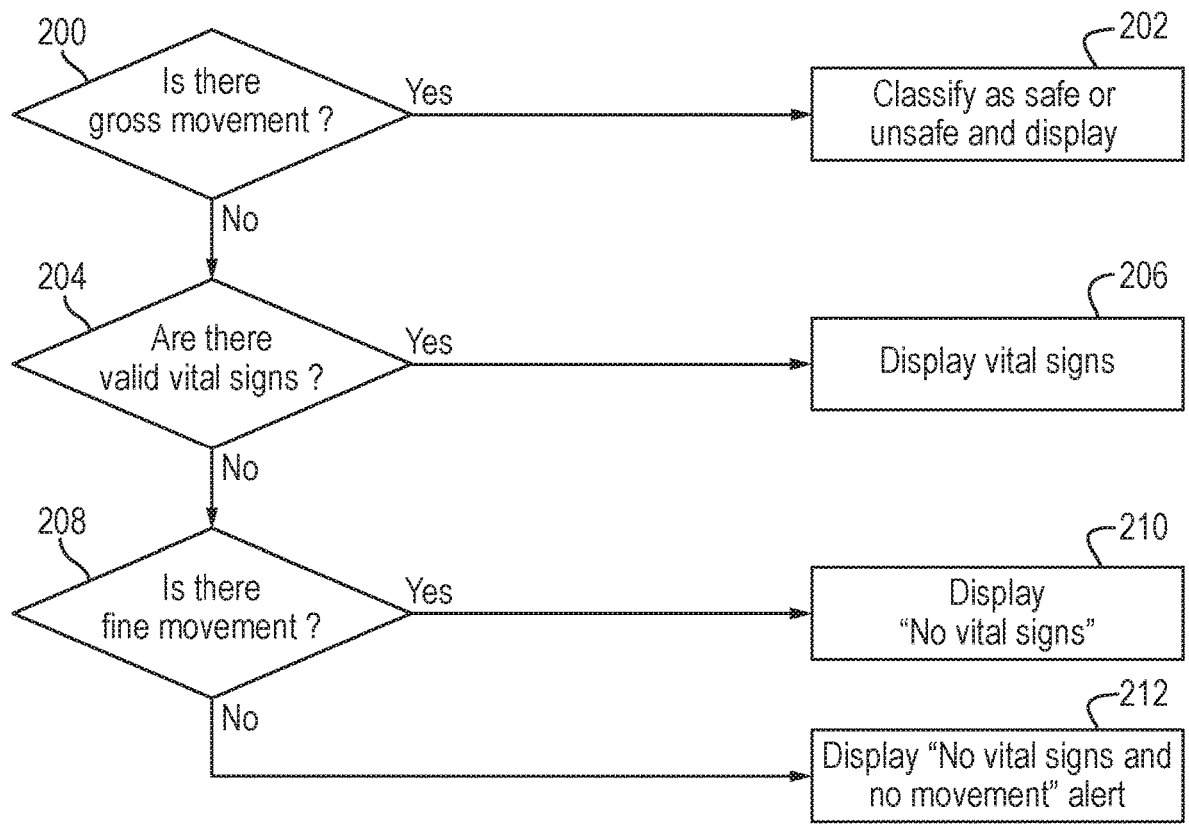
Figure 3:
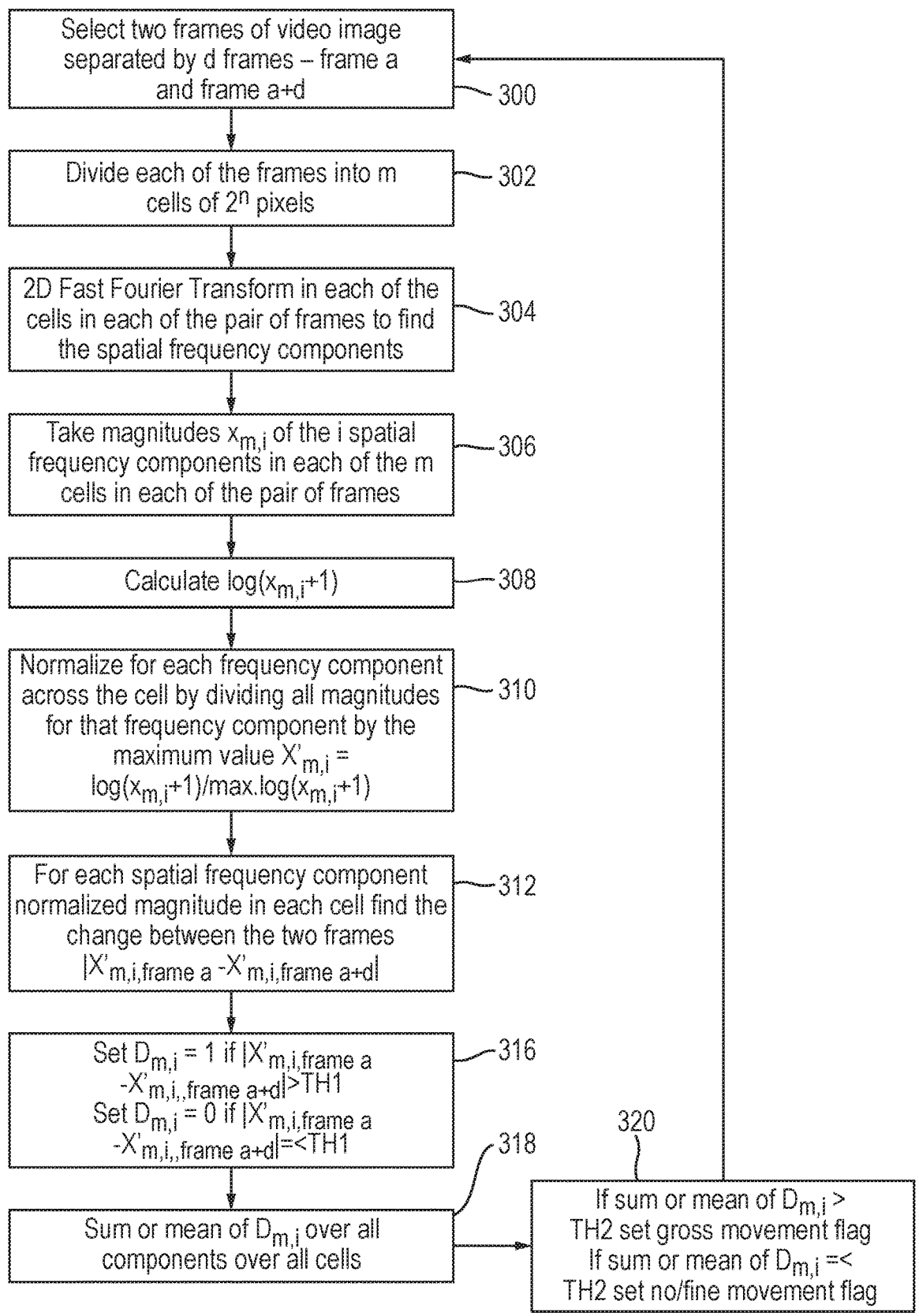
Figure 4:
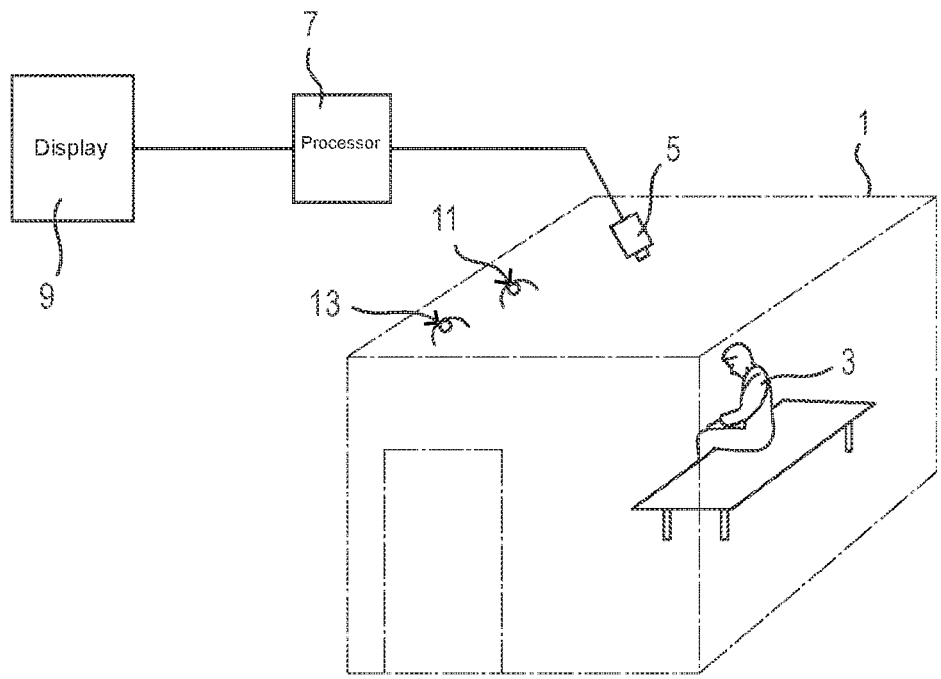

FIG. 1 illustrates schematically a vital signs monitoring method;

FIG. 2 schematically illustrates a vital signs monitoring method on which the invention may be applied;

FIG. 3 is a flow diagram illustrating one embodiment of the invention;

FIG. 4 schematically illustrates a welfare monitoring system including an image analysis apparatus in accordance with an embodiment of the invention.

The invention will be described as applied to a vital signs/welfare monitoring system usable in a secure room environment, for monitoring the welfare of subjects such as patients or prisoners who are restrained in a secure room. FIG. 4 schematically illustrates an apparatus in accordance with an embodiment of the invention being used to monitor a subject 3 in a room 1. The room 1 can be a secure room such as a police or prison cell or some other detention facility, or could be a room in a hospital or other care facility such as a care home, sheltered accommodation or the subject's own home. The subject 3 is monitored by a video camera 5 whose output is processed by a video signal processor 7 and the results of the analysis are displayed on a display 9 which is visible to staff of the facility. The video signal processor 7 may be a dedicated signal processor or a programmed general purpose computer. The room may be naturally lit, e.g. via window 10 and may be artificially illuminated using a visible light source 11 or infrared light source 13.

The video camera 5 is a standard digital video camera outputting video data in the form of a sequence of image frames, each frame being a pixel array of intensities in red, green, blue channels. The red, green and blue channels also give a response in the infrared range allowing the production of an infrared (IR) image useful when the room is dark. Video cameras of this type typically output the signal at twenty frames per second, though of course different frame rates are possible.

The display 9 preferably displays the video image of the room and also displays information regarding the health or safety of the subject 3. This information is preferably:—

Whether movement is detected.
Whether vital signs are being acquired.
Whether the subject is judged to be safe.
Current values of estimated vital signs such as heart rate and breathing rate.
Whether no vital signs have been detected and the time for which no vital signs have been detected.
A no movement and no vital signs alert or alarm.

Staff monitoring the subject by way of the display 9 can therefore tell at any given time whether the subject is considered safe, for example because they are moving or because the vital signs are being detected and are in a physiologically normal range, or whether the system is unable to detect vital signs and safe movement is detected (and for how long that situation has persisted), or that no vital signs and no movement is detected, in which case an alert is generated willing staff to check the subject. If the lack of vital signs detection persists for more than a configurable amount of time an alert may be generated to call on staff to check the subject. Alerts can include a range of electronic notification methods including automated telephone message, pager, SMS, as well as indication on the display 9 with the alert containing the condition and location of the subject and the condition being alerted.

FIG. 1 schematically illustrates the overall processing by video signal processor 7. In this embodiment the video analysis system analysis the video image captured by camera 5 to detect the vital signs of the subject (such as heart rate and breathing rate), and in parallel analyses the video image to detect whether it contains gross movement of the subject, fine movement of the subject or no movement of the subject. As mentioned above gross movement is, for example, the subject walking or running or jumping, and in the case of gross movement it is normal to suspend analysis of the video to detect vital signs such as heart rate or breathing rate because it is difficult to perform such analysis in the presence of gross movement. As illustrated in FIG. 1, therefore, in step 100 the video is acquired and is subject both to movement detection in step 102 and vital signs detection or estimation in step 104. Step 104 may be suspended if gross movement is detected in the video sequence. The results of the movement detection and vital signs detection are interpreted and validated in step 106 and displayed in step 108 on display 9.

FIG. 2 schematically illustrates the interpretation and validation step 106. In step 200 the first determination is made as to whether gross subject movement is present in the video image. If gross movement is present then the movement is analysed to be classified as safe or unsafe and a corresponding display made in step 202. If no gross movement is present then, firstly, if valid vital signs have already been detected (in the previous pass through the process), then these are displayed in step 206. If not, then a determination is made as to whether fine movement is present in the image. If fine movement is present, but no vital signs have been detected, then a display "no vital signs" is made in step 210. On the other hand if no fine movement is detected, then a display "no vital signs and no movement" alert is made in step 212, which may indicate that the subject is in a serious condition.

It will be understood, therefore, that a critical point in the process is determining in step 200 whether or not gross movement is present. If gross movement is present in the image then it is difficult to detect vital signs reliably and so vital signs detection is suspended, but such gross movement is also regarded as indicating that the subject is, at least, alive. Consequently if some image artefact is mistaken for gross movement of the subject, serious consequences may result. The present invention is therefore designed to accurately detect gross movement of a subject despite the presence of image artefacts such as illumination changes, especially in natural light illuminated scenes.

The image processing in accordance with one embodiment of the invention is illustrated in FIG. 3. Firstly, in step 300, in the sequence of image frames forming the video image, two frames separated by a predetermined number (d) of frames are selected. The separation may be, for example, ¼ second or 5 frames. Then in step 302 the two selected frames are each divided into a square grid of in cells of 2" pixels, for example 16 or 32 cells, which may be each of 8×8=64 or 16×16=256 pixels. The size of the cells will determine how big a gross movement of the subject is before it is recognised and thus the size of the cells needs to be tuned to the particular image view being analysed.

Then in step 304 each of the cells is subjected to a two dimensional spectral analysis, for example by Fast Fourier transform, to determine the spatial frequencies (2D power spectrum) in each of the cells. The spectral analysis will return values for i components from a minimum spatial frequency corresponding to one cycle per cell and a maximum of spatial frequency of one cycle per sample (pixel position). There will be i=n*n different frequency components. In step 306 the magnitude $x_{m,i}$ of each of the i different frequency components is then taken in each of the m cells. It is the difference between the magnitudes of corresponding frequency components in corresponding cells of the pair of selected frames which will be used to determine whether image changes are caused by illumination variations or gross movement.

In this embodiment each of the magnitudes is processed in step 308 by adding one and taking the logarithm, and then in step 310 the resulting values are normalised within each cell by dividing them by the value of the largest magnitude for that cell.

Then, in step 310, for each corresponding air of cells in the two selected frames, the absolute differences between the normalised log magnitudes X' of corresponding frequency components is taken for all frequency components| $X'_{m,i,frame\ a} - X'_{m,i,frame\ a+d}|$. In step 316 these values are thresholded to give a value $D_{m,i}$ of 1 if they are above the threshold or 0 if below. This first threshold is set by comparing a video sequence which contains subject movement and one which contains, for example, changes in illumination by sunlight.

In step 318 the number of cells and components giving a value of 1 is compared to a threshold, either by summing the $D_{m,i}$ values or taking the mean of the $D_{m,i}$ values, and if the number is greater than the second threshold then the video image is determined as containing gross movement, whereas if the number is lower than the second threshold the video image is determined as not containing gross movement, (it may include an illumination change or no/fine movement). This determination forms the output of step 200 of FIG. 2. Subsequent processing can determine if there is fine or no movement, and can also determine that, if no gross movement has been detected, then large-scale changes are illumination changes.

The processing will be continuously repeated for further pairs of image frames selected from the video sequence, for example, a new pair each moved along by one frame so that a continual analysis is conducted on a video sequence as to whether it is containing gross subject movement or not.

It should be noted that the number and size of cells in may be varied and the spacing d of the pair of frames under consideration may be varied. Furthermore, the method may be enhanced by varying the way in which the selected image frames are divided into cells. For example, in successive passes through the processing, the position and/or size of the cells may be varied so that there are successive sets of overlapping cells.

The invention claimed is:

1. A method of analysing a video image of a subject in a room to provide status or alerting of a subject's condition, the video image comprising a sequence of image frames, the method comprising the steps of: selecting, from the video image, two image frames spaced by a predetermined number of image frames; dividing each of the selected image frames into a plurality of cells; calculating a magnitude of spatial frequency components in each of the cells in each of the selected image frames; determining differences between the magnitudes of corresponding spatial frequency components in corresponding cells of the selected frames; determining, for all cells and spatial frequency components a number of magnitude differences which are greater than a first threshold; determining that the sequence of image frames contains gross movement of the subject if the number exceeds a second threshold, and in that event analysing the movement to classify it as safe or unsafe;

when the gross movement is determined as not being present, determining whether valid vital signs of the subject have been detected in the video image and displaying them in response to detecting the valid vital signs of the subject in the video image;

when the gross movement is determined as not being present and valid vital signs of the subject have not been detected in the video image, determining whether fine movement is present in the video image, and, displaying that no vital signs of the subject have been detected in response to the fine movement being present in the video image; and when the fine movement is determined as not being present in the video image, displaying an alert indicating no vital signs of the subject and no movement of the subject.

2. The method according to claim 1 wherein the magnitude of the spatial frequency components in each of the cells in each of the selected image frames is calculated by a two-dimensional fast Fourier transform in each cell.

3. The method according to claim 1 wherein the first threshold is set in a parameter tuning process comprising the steps of:

capturing a video image sequence of the subject who is performing gross movement;

capturing a video image sequence containing an illumination change; and setting the first threshold to maximise the difference in the number of magnitude differences which are greater than the first threshold between the two image frames.

4. The method according to claim 1 wherein the magnitudes are respectively normalized by dividing them by the largest magnitude for that cell before taking the differences.

5. The method according to claim 1 wherein the mean or sum of the number of spatial frequency components for which the magnitude differences are greater than the first threshold is compared to the second threshold to perform said determination that the sequence of image frames contains gross movement.

6. The method according to claim 1 wherein the frames are subdivided into a rectangular grid of the cells.

7. The method according to claim 1 wherein the frames are subdivided into a square grid of the cells.

8. The method according to claim 1 further comprising repeating the method with a different number or size of cells.

9. An apparatus for monitoring a subject in a room to provide status or alerting of a subject's condition, the apparatus comprising: a video camera configured to capture a video image sequence of the room; a data processor configured to automatically process the video image sequence to distinguish between movement of the subject in the image and illumination changes in accordance with the method of claim 3; and a display or other output device which, under the control of the data processor, outputs a visible or audible indication of a classification of movement and an indication of the detection of the vital signs of the subject.

10. A computer program comprising program code stored on a non-transitory computer readable medium, the computer program configured to process a captured video image sequence of a subject in a room to automatically distinguish between movement of the subject in the image and illumination changes in accordance with the method of claim 1.

* * * * *